July 31, 1951   C. C. DAVIS   2,562,379
FILM DRIVING APPARATUS
Filed April 10, 1946   2 Sheets-Sheet 1

INVENTOR
C. C. DAVIS
BY
J. F. McEneany
ATTORNEY

July 31, 1951     C. C. DAVIS     2,562,379
FILM DRIVING APPARATUS

Filed April 10, 1946     2 Sheets-Sheet 2

INVENTOR
C. C. DAVIS
BY
*J. F. McEneany*
ATTORNEY

Patented July 31, 1951

2,562,379

UNITED STATES PATENT OFFICE 2,562,379

FILM DRIVING APPARATUS

Charles C. Davis, West Los Angeles, Calif., assignor to Western Electric Company, Incorporated, New York, N. Y., a corporation of New York Application April 10, 1946, Serial No. 661,167

3 Claims. (Cl. 271—2.3)

This invention relates to a sound film propulsion mechanism and more particularly to improvements in mechanical filtering systems employed in such mechanism to suppress oscillations produced in the film by the film driving elements.

In a sound film driving mechanism in which the film is delivered to and drawn from an exposure point by toothed sprockets, it is known that despite all efforts to maintain uniform rotational speed of the sprockets, disturbances are introduced by the sprocket drive which are, in turn, transmitted to the film. It has been proposed heretofore to provide means for suppressing these undesired disturbances in the film at the exposure point, the proposed means taking the form of a pair of pivotally mounted, yieldably interconnected arms each provided at its free end with a film engaging roller. In this arrangement one roller engages the film preceding its passage to the exposure point, while the second roller engages the film after it passes through the exposure point. The yieldable connection between the arms usually takes the form of a coiled spring.

This type mechanical filter produces equal tension in the film on opposite sides of the exposure point and any disturbance during operation tending to increase or decrease the normal tension in the film on one side of the exposure point will produce, through the filter assembly, an equal increase or decrease in tension in the film on the other side of the exposure point to thereby maintain substantially uniform forward film motion at the exposure point.

The use of this type double roller mechanical filter assembly has so far been limited to apparatus wherein the filter assembly may be so arranged that the pivoted arms are disposed vertically so that the force of gravity acts equally on both arms and does not therefore disturb the symmetrical position of the rollers with respect to the film support at the exposure point. While the desirability has long been recognized of using this type mechanical filter in sound film propulsion mechanism wherein the film travels in a substantially vertical path from a feed reel, past an exposure point and to take-up reel, its use in such apparatus has not been possible due to the fact that the force of gravity on the arms tends to urge one roller toward the film support and the other roller away from the film support at the exposure point, thereby preventing the maintenance of the rollers in symmetrical position with respect to and free from contact with the support.

It is the object of this invention to provide an improved double roller mechanical filter for a film propulsion mechanism in which provision is made for compensating for the force of gravity on one roller arm to insure symmetrical positioning of the rollers with respect to the exposure point and therefore equal tension in the film as produced therein by the rollers on opposite sides of the exposure point.

It is a further object of this invention to provide a double roller damping unit in which resonant oscillation of the damping unit itself will be effectively suppressed without substantial interference with the attenuating characteristics of the damping unit for disturbing frequencies above the resonant frequency of the damping unit.

In accordance with this invention compensation is obtained by the provision of means producing a force on one pivoted arm pulling it upward with twice the force of gravity so that this arm creates an upward force equal to the downward force of the second arm. This force compensating for the force of gravity may be produced by a separate coiled spring in addition to the coil spring connecting the pivoted arms, by the interconnecting coiled spring alone secured to the two arms at different arm lengths from the pivot points or by the use of the interconnecting coiled spring connected at equal arm length from the film engaging rollers but to pivoted arms of different lengths.

The invention will be more readily understood from the following specification when read in connection with the accompanying drawings in which.

Figure 1:
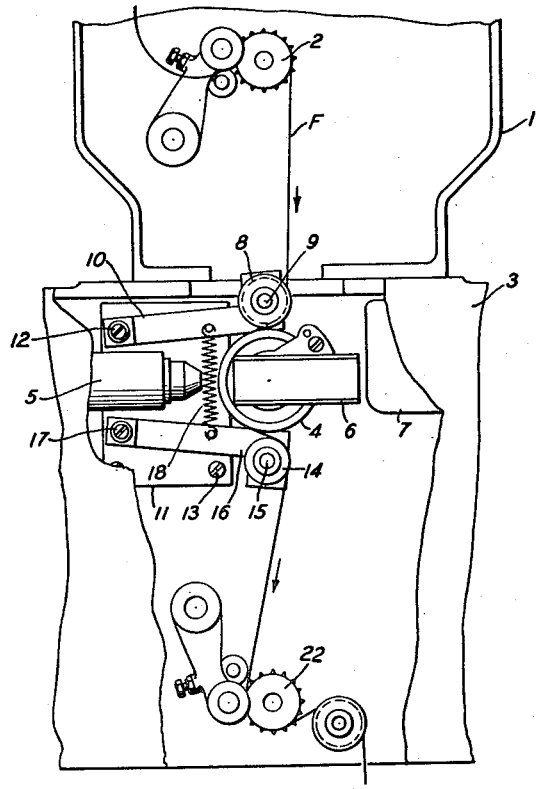
Fig. 1 is an elevation of a sound film apparatus incorporating a double roller damping assembly.

Referring to Fig. 1, numeral 1 designates a motion picture camera or projector housing containing a lower film driving sprocket 2, which draws a film F from an intermittent mechanism and feeds it to a sound recording or reproducing apparatus contained in a housing 3 located below and secured to housing 1.

Film F engages and produces rotation of a hollow drum 4 located at the exposure point of an optical system comprising condenser lens elements mounted in a tube 5 and objective lens elements mounted in a tube 6. Housing 7, mounted within housing 3, contains a photoelectric cell and an associated amplifier. The drum 4 is secured to a freely rotatable shaft to the opposite end of which is secured a suitable inertia means, such as a flywheel (not shown).

A roller 8, rotatably mounted on a shaft 9 secured in arm 10, engages film F preceding its engagement with drum 4. Arm 10 is pivotally mounted on a mounting plate 11 at 12. The mounting plate 11 is secured to the inner wall of housing 3 by suitable machine screws, one of which is shown at 13. A second roller 14, rotatably mounted on shaft 15, engages the film F after its passage through the optical system. Shaft 15 is secured in arm 16 which is pivotally mounted on plate 11 at 17.

The two pivoted arms 10 and 11 are yieldably interconnected by means of a coiled spring 18. A constant speed sprocket 22 draws the film through the optical system and feeds it to a suitable take-up mechanism.

It is essential to proper operation of the above-described damping unit that the two rollers be arranged symmetrically with respect to and free from contact with the drum supporting the film at the exposure point. With the damping unit as shown in Fig. 1 with the pivoted arms disposed in a substantially horizontal position, the force of gravity acting on upper roller 8 is effective to urge this roller toward drum 4 while the same force acting on the lower roller 14 is effective to urge this roller away from the drum. It will be obvious that because of the force of gravity acting on the arms, the rollers cannot be maintained in symmetrical arrangement with respect to and free from contact with the drum during a film driving operation. Therefore, this type damping unit employing horizontally disposed roller arms has up to the present time been completely ineffective as an attenuator of disturbances in the sprocket driven film.

In accordance with this invention, novel improvements are incorporated in this damping assembly by means of which an upward force equal to twice the force of gravity is applied to the arm which would normally be drawn away from the film by the force of gravity, to produce a tension in the film on one side of drum 4 which is equal to the tension produced in the film on the other side of this drum.

Figure 2:
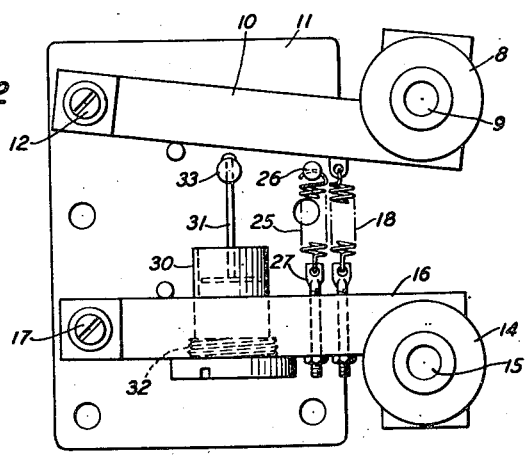
Fig. 2 is an enlarged showing of a double roller damping assembly in accordance with this invention.

Referring to Fig. 2, the compensating force on lower arm 16 is produced by a coiled spring 25 having one end anchored to a pin 26 and the other end secured to a bolt 27 which is secured in arm 16. The pin 26 is supported in plate 11. Spring 25, disposed in parallel relation with spring 18, is designed and arranged to produce an upward force on arm 16 equal to twice the force of gravity.

It is often found desirable during operation of the film drive disclosed herein to shift the film at the sound exposure point to correct small errors in synchronization between sound and picture or to synchronize the sound track in one reproducer with the sound track in a separate, synchronously driven reproducer in a studio rerecording operation. This phase shift of the film at the exposure point relative to driving sprockets 8 and 12, may be accomplished by providing vernier adjustment means (not shown) for vertically shifting the spring anchoring pin 26 in plate 11. This vernier adjustment of the anchored end of spring 25 will produce the sufficiently small simultaneous shift in the position of the two rollers 8 and 14 and the film therebetween to correct small errors in synchronization. The vernier adjustment means may be located on the rear of the inner wall of compartment 3 or in an accessible position on the front of this inner wall so that the necessary adjustment can be made during operation. The film at the exposure point may be moved a distance equal to the distance between two film perforations without appreciably altering the predetermined filter characteristics of the double roller damping assembly.

Figure 3:
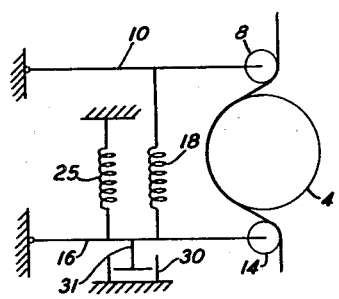
Fig. 3 is a diagrammatic showing of the elements of the damping assembly as shown in Fig. 2.

Fig. 3 shows diagrammatically the elements of the damping unit assembly of Fig. 2 incorporated in a film driving mechanism similar to that shown in Fig. 1.

Figure 4:
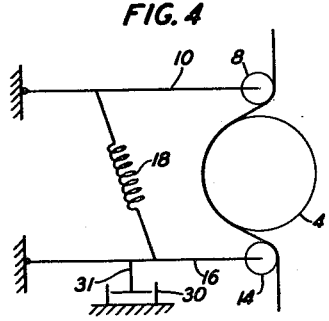
Figs. 4 and 5 are diagrammatic showings of alternative arrangements of the elements of the damping assembly in accordance with this invention.

Fig. 4 shows diagrammatically an alternative arrangement of the elements of the damping assembly in which compensation for the force of gravity on the lower arm 16 is obtained by connecting the opposite ends of spring 18 to the pivoted arms 10 and 16 at different distances from the pivot point.

Figure 5:
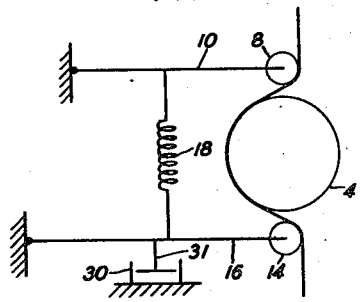

Fig. 5 shows diagrammatically a further alternative arrangement of the elements of the damping assembly in which compensation for the force of gravity on the lower arm is obtained by employing pivoted arms of different lengths and connecting the opposite ends of spring 18 to arms 10 and 16 at equal distances from the roller supporting ends of these arms.

Referring to Fig. 2, a fluid friction damping unit is associated with the double roller filter assembly to prevent a high peak of an actual increase in transmission of the resonant frequency of this filter assembly. This fluid friction damping unit comprises an oil-filled cup 30 and a plunger 31. The cup 30 is removably secured in arm 16 by engagement of an external thread 32 on the cup 30 with a suitably threaded portion in arm 16. This cup may be readily removed for cleaning and replacement of the damping fluid. The plunger 31 is attached to plate 11 through a ball joint 33, or the equivalent. The use of ball joint 33 permits relaxation of tolerances of alignment and permits small clearance between the plunger and oil cup. By making the plunger light and the ball joint free fitting, no appreciable static friction is created between the plunger and cup.

A single fluid friction damping unit is applied to the lower arm 16 instead of a separate unit to each of the arms 10 and 16. It is desirable to favor attenuation of disturbances from the projector or camera sprocket 2 which is not necessarily designed for accurate propulsion as is sprocket 22. It was found that arm 10 could be left free of direct fluid friction damping to thereby give greater attenuation of disturbances arising at sprocket 2 and at the same time receive sufficient damping from the single dash pot through arms 16 and spring 18 to suppress its vibration at the resonant frequency of the filter assembly.

This invention, therefore, provides a double roller damping assembly incorporating novel improvements permitting its use in a film propulsion mechanism in which it is necessary to dispose the pivoted arms of the damping assembly in a horizontal position.

What is claimed is:

1. The combination in a film propelling apparatus having a film-driven drum and sprocket means for driving said film, of a mechanical filtering means engaging said film on opposite sides of said drum, said means comprising a pair of spaced, horizontally disposed pivoted arms each having a film-engaging roller rotatably mounted in the free end thereof, spring means connecting said pair of arms between the pivoted ends and free ends thereof and further spring means associated with one of said arms producing therein an upward force equal to twice the force of gravity on one of said arms.

2. The combination in a sound film recording or reproducing apparatus provided with a light exposure point for said film and sprocket means for driving said film past the exposure point, of a mechanical filtering means engaging said film on opposite sides of the exposure point, said filtering means comprising a pair of horizontally disposed pivoted arms each having a film-engaging roller rotatably mounted in the free end thereof, a coiled spring having one of its ends connected to one of said pair of arms between its pivoted end and its free end, and its other end connected to the other of said pair of arms between its pivoted end and its free end, a second coiled spring having one of its ends anchored and its other end secured to one of said pair of arms to produce therein an upward force equal to twice the force of gravity on one of said arms.

3. The combination in a sound film recording or reproducing apparatus having an optical system and sprocket means for driving said film past said optical system, of a mechanical filtering means, said filtering means comprising a pair of spaced, horizontally disposed pivoted arms each having a film-engaging roller rotatably mounted in the free end thereof, resilient means connecting said pair of arms between the pivoted ends and the free ends thereof, further resilient means supporting one of said arms with a force equal to twice the force of gravity acting thereon, and fluid friction damping means operatively connected to one of said arms to suppress oscillations of the mechanical filtering means at its resonant frequency.

CHARLES C. DAVIS.

REFERENCES CITED

The following references are of record in the file of this patent:

UNITED STATES PATENTS

| Number | Name | Date |
| --- | --- | --- |
| 1,831,562 | Heisler | Nov. 10, 1931 |
| 1,892,554 | Kellogg | Dec. 27, 1932 |
| 1,906,186 | Deville | Apr. 25, 1933 |
| 1,920,789 | Heisler | Aug. 1, 1933 |

FOREIGN PATENTS

| Number | Country | Date |
| --- | --- | --- |
| 649,963 | Germany | Sept. 8, 1937 |
| 370,001 | Great Britain | Mar. 24, 1932 |
| 506,654 | Great Britain | June 1, 1939 |